March 25, 1924.
L. O. VOSE
1,487,989
APPARATUS FOR MEASURING THE RATE OF FLOW OF GASES
Filed April 18, 1922
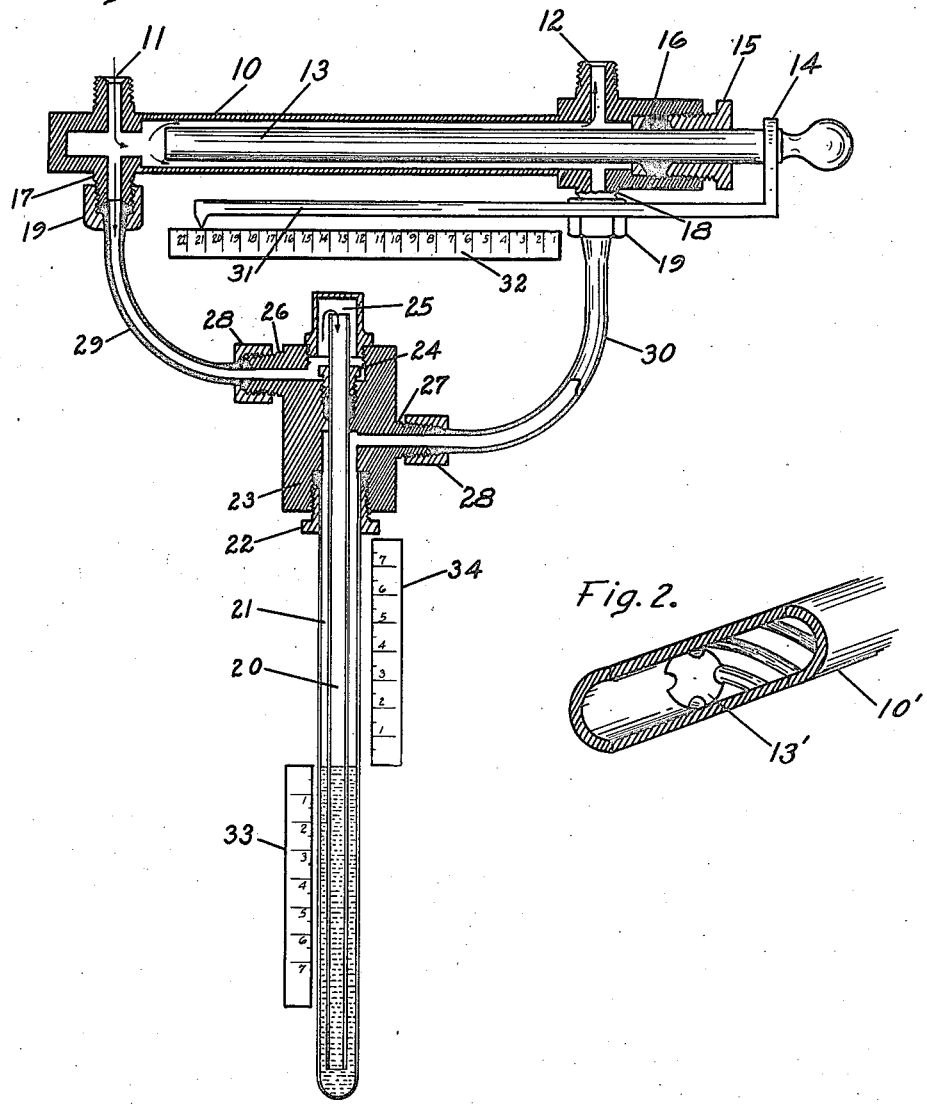
LEONARD O. VOSE, INVENTOR.
BY
Emil F. Lang, ATTORNEY.

Patented Mar. 25, 1924.

1,487,989

UNITED STATES PATENT OFFICE.

LEONARD O. VOSE, OF LINCOLN, NEBRASKA.

APPARATUS FOR MEASURING THE RATE OF FLOW OF GASES.

Application filed April 18, 1922. Serial No. 555,073.

*To all whom it may concern:*

Be it known that I, LEONARD O. VOSE, a citizen of the United States, residing at Lincoln, in the county of Lancaster and State of Nebraska, have invented certain new and useful Improvements in Apparatus for Measuring the Rate of Flow of Gases, of which the following is a specification.

My invention relates to apparatus for measuring the rate of flow of gases, and more especially to the type of such apparatus which utilizes a variable resistance to bring about a difference in pressures which are readable on a differential manometer, and which when thus read can be easily translated into rate of flow in units of volume per unit of time.

Such apparatus heretofore has been open to the objection that no provision was made for applying a definite, predetermined amount of resistance, thus making necessary either careless guess work or elaborate calculations and materially limiting the usefulness of such apparatus. My object is to provide an apparatus of this type which will be free from this and numerous other objections.

Figure 1 is a view of my entire apparatus, with parts broken away and in section.

Figure 2 is a detail view showing a modification.

Numeral 10 refers to a tube having an inlet nipple 11 and an outlet nipple 12 for the flowing gas. The tube is permanently closed at its end adjacent the inlet nipple but is constructed with an open end adjacent the outlet nipple. The interior of the tube is narrowest at its inlet end, but its main portion has a somewhat greater diameter. Each portion is cylindrical. The open end adjacent the nipple 12 is interiorly screw-threaded.

Mounted to slide in the tube 10 is a plunger 13 which serves as the resistance element. The plunger is provided with a handle 14 of any suitable design. To prevent the escape of gas, I provide a smooth-fitting collar 15 for the plunger, and this collar is externally screw-threaded to fit into the screw-threaded open end of the tube 10. Back of the collar I surround the plunger with a disc of rubber 16 or any other suitable form of packing to insure a gas tight connection.

In the casing 10, diametrically opposite the inlet and outlet openings and in line with these openings, I form screw-threaded nipples 17 and 18. The two terminals of a differential manometer are connected to these nipples by means of screw-threaded collars 19.

The differential manometer as shown consists of two concentric tubes and a suitable mounting. The inner tube 20 is open at both ends while the outer tube 21 is closed at its bottom. The outer tube has a tightly fitting collar 22 on its upper and open end, the collar being externally screw threaded for securing it to the block 23, the joint being made gas tight by means of packing material. The tube 20 extends vertically through the block 23 and is provided at its upper end with a collar 24 similar to the collar 22 which is screw threaded into the block 23 and is similarly made gas tight by means of packing material. Above the upper and open end of the tube 20 is an enclosed chamber 25 produced in this instance by screw threading a hollow block into a suitable opening in the top of the block 23. At the sides of the block are nipples 26 and 27, these nipples being similar to the nipples 17 and 18, and collars 28 are secured to these nipples. The nipple 26 is connected by a channel with the chamber 25 and thus with the tube 20, while the nipple 27 is connected through its channel directly with the upper open end of the tube 21. Tube 29 connects the nipples 17 and 26, the collars 19 and 28 serving to make the connections air tight. Similarly the tube 30 connects the nipples 18 and 27.

Connected to the plunger 10 at its handle end is a pointer 31 cooperating with a scale 32, the pointer being of substantially the same length as the plunger and terminating in a down turned point adjacent the scale 32. Other scales 33 and 34 are part of the manometer apparatus, and serve to indicate the heights of the liquid columns in the tubes 20 and 21.

In operation, a suitable liquid is introduced into the tubes 20 and 21 in quantities sufficient to bring their common level to the zero mark on the scales 33 and 34, or if desired, the scales may be so mounted that they can be slidably adjusted to bring the zero mark to the level of the liquid. The nipples 11 and 12 are then connected to a source of gas in motion, the gas entering at 11 and leaving at 12. If the plunger is set at zero, the gas will encounter no resistance to its passage and the pressure on the two liquid columns will be the same, thus leaving the liquid columns undisturbed. If however the plunger is pushed in, the gas in its exit must pass through a restricted passage, and must also encounter a considerable increase in friction because of the increased surface over which it must travel. The plunger functions much as a dam in a stream of water to increase its "head" or pressure. In consequence the pressure at the inlet is greater and the pressure at the outlet is less than the normal. This difference in pressure is communicated to the tubes, causing the level in the inner tube to fall and the level in the outer tube to rise, and these levels are readable directly on the scales. If it is desired to increase or decrease the resistance it is only necessary to push in or pull out the plunger. It should be here noted that if the scale 32 is properly adjusted to zero, the readings on the scale will indicate the precise ratios of resistance.

In general, any liquid is suitable for use in the tubes 20 and 21, but in actual practice it is necessary to select a liquid which is compatible with the gas whose rate of flow is being measured. For instance if the gas is ammonia gas and the liquid in the tubes is water, it will be found that in the beginning of the operation the water will absorb enough of the gas to disturb the accuracy of the readings. If the liquid were hydrochloric acid the ammonia gas would not only be absorbed in considerable quantities, but a precipitate would be formed which would tend to clog the apparatus. The liquid selected must have neither a solvent nor a chemical action on the gas selected.

If the surface areas of the two columns of liquid are equal, the rise in one tube will be equal to the fall in the other tube, and the reading may be made on either scale. If these areas are unequal the mean should be taken between the two readings, or if desired the scales 33 and 34 may be calibrated in the ratio of the surface areas. In any case however, the difference in pressure is taken as the criterion in measuring the rate of flow of the gas.

If it is desired to determine the rate at which a gas is entering a flowing solvent, the index 31 is set at a point corresponding to the rate of flow of the solvent, and the percentage or proportion of the gas entering the solvent is then indicated directly by the manometer reading.

Having thus described my invention and the manner in which it is used, what I believe to be new and desire to secure by Letters Patent of the United States is:—

1. A device for causing a drop and indicating in pressure in a flowing gas, said device being provided with an elongated passageway of reduced cross section, and manually operable means for varying the length of the reduced passageway.

2. A device for causing and indicating a drop in pressure in a flowing gas, said device being provided with an elongated channel of uniform cross section for the passage of the gas, means for uniformly reducing the cross section of the channel throughout a definite portion of its length, and manually operable means integral with said reducing means for varying the length of the reduced portion of the channel, said manually operable means having an indicator secured thereto for indicating the length of the reduced portion of the channel.

3. In a device for causing a drop in pressure in a flowing gas, a hollow cylindrical tube for the passage of the gas therethrough, there being an inlet and an outlet for said tube, a cylindrical plunger having a diameter less than that of the interior of the tube, said plunger being adjustable lengthwise in said tube to introduce a resistance to the flow of the gas, the resistance varying directly as the distance to which the plunger enters the tube, and an indicator secured to the plunger at an external point for indicating the degree of resistance in the tube.

4. A device for causing and indicating a drop in pressure in a flowing gas, said device including a cylindrical passageway for the gas, a cylindrical plunger adjustable lengthwise in said passageway, said plunger having a diameter which is less than that of the passageway, there being a gas entrance in the passageway in advance of the head of said plunger and a gas exit in said passageway adjacent the end through which the plunger moves, and means for indicating the resulting drop in pressure in the gas.

In testimony whereof I affix my signature.

LEONARD O. VOSE.